United States Patent
Faruque et al.

(10) Patent No.: US 10,343,648 B2
(45) Date of Patent: Jul. 9, 2019

(54) RESTRAINT SYSTEM

(71) Applicant: Ford Global Technologies, LLC, Dearborn, MI (US)

(72) Inventors: Mohammed Omar Faruque, Ann Arbor, MI (US); S. M. Iskander Farooq, Novi, MI (US); Dean M. Jaradi, Macomb, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 31 days.

(21) Appl. No.: 15/497,502

(22) Filed: Apr. 26, 2017

(65) Prior Publication Data

US 2018/0312135 A1 Nov. 1, 2018

(51) Int. Cl.
*B60R 22/34* (2006.01)
*B60R 22/48* (2006.01)

(52) U.S. Cl.
CPC .............. *B60R 22/48* (2013.01); *B60R 22/34* (2013.01); *B60R 2022/4825* (2013.01)

(58) Field of Classification Search
None
See application file for complete search history.

(56) References Cited

U.S. PATENT DOCUMENTS

| | | | |
|---|---|---|---|
| 3,178,225 A * | 4/1965 | Bayer | B60R 22/26 242/381 |
| 3,506,305 A | 4/1970 | Eineman, Jr. et al. | |
| 3,519,771 A | 7/1970 | Burns | |
| 4,106,721 A * | 8/1978 | Ulrich | B60R 22/44 242/371 |
| 5,664,737 A * | 9/1997 | Johnson | B65H 18/26 242/534 |
| 6,425,541 B1 * | 7/2002 | Strobel | B60R 22/415 200/61.58 B |
| 9,434,349 B1 | 9/2016 | Perkins et al. | |
| 2004/0251366 A1 * | 12/2004 | Hishon | B60R 22/44 242/390.8 |
| 2005/0156457 A1 | 7/2005 | Breed et al. | |
| 2005/0160864 A1 * | 7/2005 | Glasson | F15B 15/283 74/500.5 |
| 2012/0018989 A1 | 1/2012 | Breed | |
| 2015/0251618 A1 * | 9/2015 | Ghannam | B60R 21/01544 340/457.1 |
| 2016/0368452 A1 | 12/2016 | Le et al. | |
| 2016/0368453 A1 | 12/2016 | Wang | |
| 2017/0203714 A1 * | 7/2017 | Schlaps | B60R 22/3413 |

FOREIGN PATENT DOCUMENTS

JP H0982171 A 3/1997

OTHER PUBLICATIONS

GB Search Report dated Oct. 18, 2018 re GB Appl. No. 1806636.5.

* cited by examiner

*Primary Examiner* — Rami Khatib
*Assistant Examiner* — Evan Crosby
(74) *Attorney, Agent, or Firm* — Frank A. MacKenzie; Bejin Bieneman PLC

(57) ABSTRACT

A retractor assembly includes a housing; a spool rotatably coupled to the housing and defining an axis; a webbing coiled about the spool; a disc in contact with the webbing and movable parallel to the axis; and a linear variable differential transformer including a core movable parallel to the axis with the disc.

15 Claims, 5 Drawing Sheets

RESTRAINT SYSTEM

BACKGROUND

Vehicles, such as automobiles, may include seatbelts for occupants. One arrangement of the seatbelt is a three-point harness: webbing of the seatbelt is anchored around the occupant at three points. Specifically, the webbing may be connected at a mounting point below and to one side of a hip of the occupant, may be connected above and to the same side of a shoulder of the occupant, and may fasten to the opposite side of the hip of the occupant. The webbing is divided into a shoulder band crossing from one shoulder of the occupant to the opposite side of the hip and a lap band crossing from one side of the hip to the other.

DETAILED DESCRIPTION

A retractor assembly includes a housing; a spool rotatably coupled to the housing and defining an axis; a webbing coiled about the spool; a disc in contact with the webbing and movable parallel to the axis; and a linear variable differential transformer including a core movable parallel to the axis with the disc.

The retractor assembly may include an arm rotatably coupled to the housing and rotatably coupled to the disc. The arm may be cantilevered from the housing. The axis may be a spool axis, and the disc may be rotatable relative to the arm about a disc axis parallel to the spool axis. The disc may have a circular cross-section orthogonal to the disc axis. The disc may be positioned such that extraction of the webbing from the spool causes the disc to rotate. The retractor assembly may include a spring attached to the housing and to the arm and biasing the disc toward the spool. The disc may be threadedly coupled to the arm. The housing may be a retractor housing. The linear variable differential transformer may include an LVDT housing fixed relative to the arm, and the core may be linearly movable relative to the LVDT housing. The linear variable differential transformer may include an LVDT spring coupled to the LVDT housing and the core and biasing the core toward the disc relative to the LVDT housing. The retractor assembly may include a screw thread fixed relative to one of the disc and the arm and threadedly engaged with the other of the disc and the arm. The screw thread may extend along the disc axis.

The retractor assembly may include a control module in communication with the linear variable differential transformer. The housing may be a retractor housing, and the linear variable differential transformer may include an LVDT housing fixed relative to the arm. The control module may be programmed to receive a signal from the linear variable differential transformer indicating a position of the core relative to the LVDT housing. The control module may be programmed to adjust a load limit of the retractor assembly based on the position of the core relative to the LVDT housing.

The retractor assembly provides a convenient and robust manner of classifying occupants by size. The retractor assembly may have low error rate and high resolution, and the retractor assembly may not require any modifications to the webbing. The size classification of the occupant may be useful to allow a control module to customize one or more safety features of the vehicle, for example, a load limit of an automatic locking retractor, a stiffness of an airbag, and/or a stroke absorption of a steering column.

Figure 1:
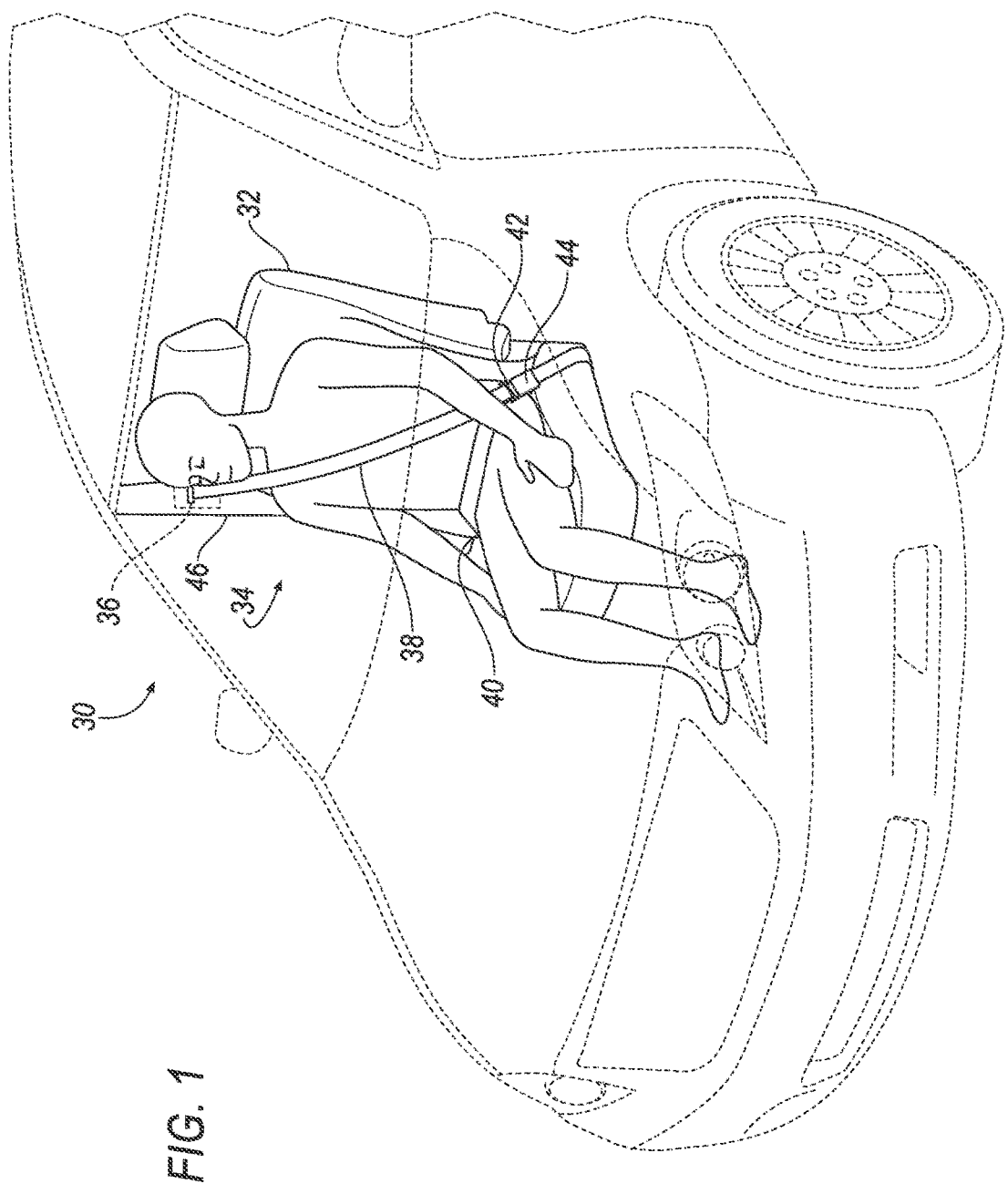
FIG. 1 is a perspective view of a vehicle seat with a restraint system in a vehicle.

With reference to FIG. 1, a vehicle 30 includes a seat 32 that may support an occupant. The seat 32 may be a front seat or a rear seat, and may be in any cross-vehicle position. The seat 32 shown in FIG. 1 is a bucket seat, but alternatively the seat 32 may be a bench seat or another type of seat.

A restraint system 34 of the vehicle 30 may include a retractor assembly 36, webbing 38 retractably payable from the retractor assembly 36, an anchor 40 coupled to the webbing 38, and a clip 42 that engages a buckle 44. The restraint system 34, when fastened, retains the occupant on the seat 32, e.g., during sudden decelerations of the vehicle 30.

The restraint system 34 of FIG. 1 is a three-point harness, meaning that the webbing 38 is attached at three points around the occupant when fastened: the anchor 40, the retractor assembly 36, and the buckle 44. The restraint system 34 may, alternatively, include another arrangement of attachment points.

The retractor assembly 36 may be attached to a body (not numbered) of the vehicle 30, e.g., to a B pillar 46 in the instance the seat 32 is a front seat, to a C pillar (not numbered) when the seat 32 is a rear seat, etc. The retractor assembly 36 may alternatively be mounted to the seat 32.

The anchor 40 may attach one end of the webbing 38 to the seat 32. The other end of the webbing 38 may feed into the retractor assembly 36. The clip 42 may slide freely along the webbing 38 and, when engaged with the buckle 44, may divide the webbing 38 into a lap band and a shoulder band.

Figure 2:
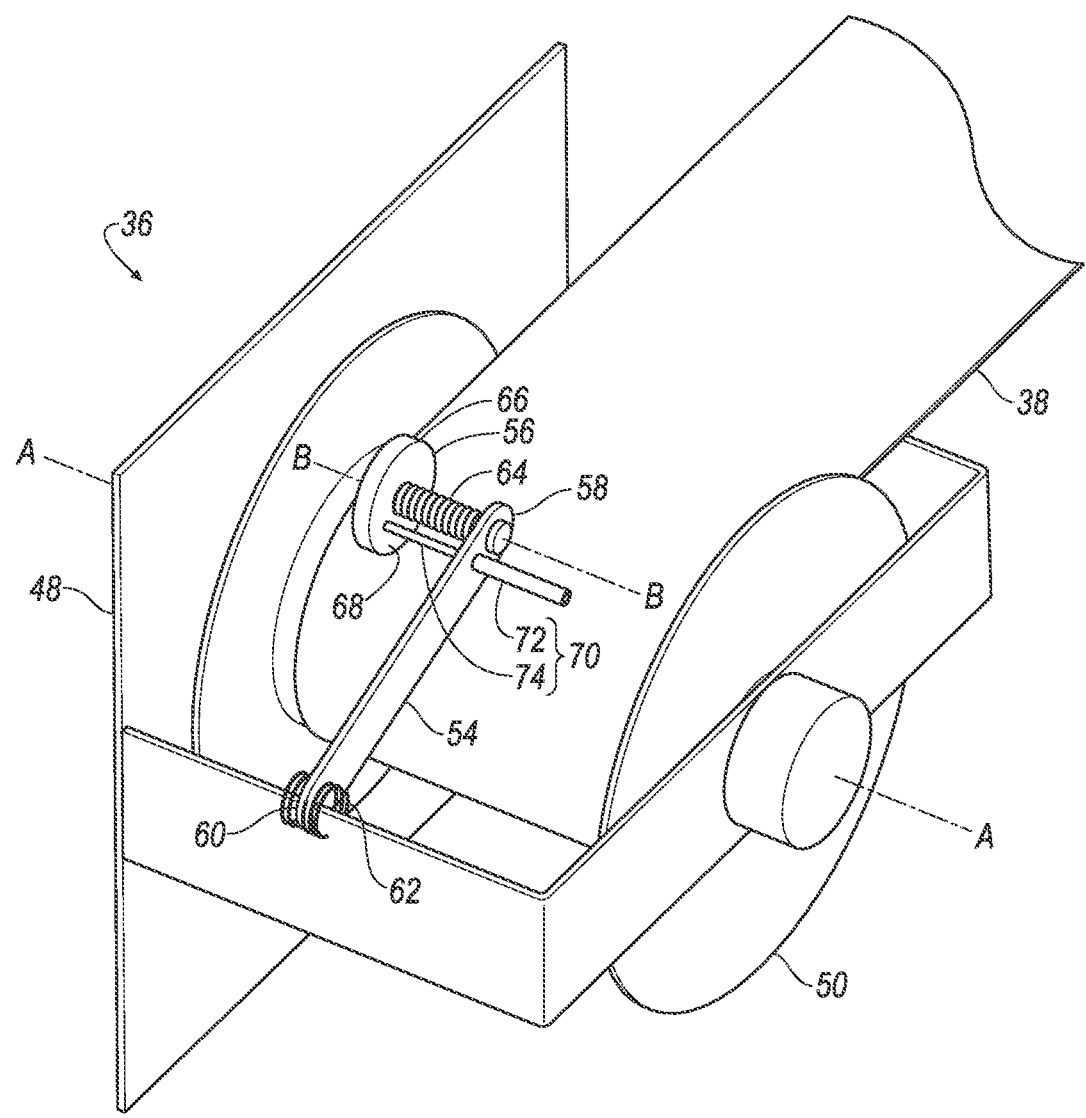
FIG. 2 is a perspective view of a retractor assembly of the restraint system.
Figure 3:
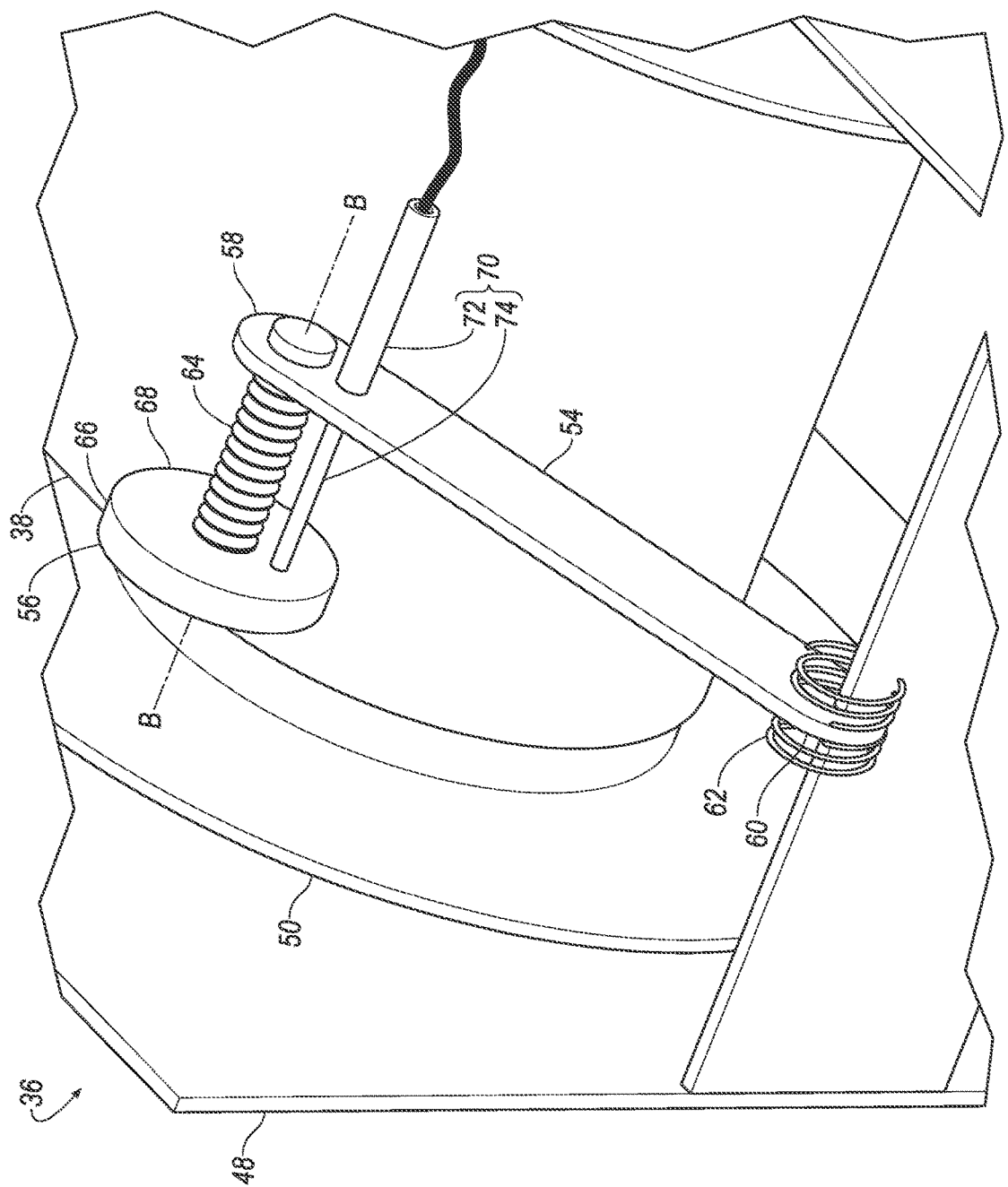
FIG. 3 is a perspective view of a portion of the retractor assembly.

With reference to FIGS. 2 and 3, the retractor assembly 36 may be contained in a retractor housing 48. The retractor housing 48 may be formed of metal or plastic. The retractor housing 48 may be mounted to a body (not numbered) of the vehicle 30, e.g., to the B pillar 46 in the instance the seat 32 is a front seat, to a C pillar (not numbered) when the seat 32 is a rear seat, or may be mounted to the seat 32.

a spool 50 is rotatably coupled to the housing. The spool 50 may freely rotate relative to the housing. The spool 50 may be cylindrical in shape. The spool 50 may define a spool axis A about which the spool 50 rotates. The spool 50 may be adapted to receive the webbing 38, for example, by including a webbing attachment slot and permitting the webbing 38 to coil around a shaft of the spool 50.

The webbing 38 may be attached to the spool 50 and coiled about the spool 50. Specifically, one end of the webbing 38 may be attached to the anchor 40, and another end of the webbing 38 may be attached to the spool 50, with the webbing 38 wound around the spool 50 beginning at that end. The webbing 38 may be formed of fabric, e.g., woven nylon, in the shape of a strap.

Figure 5:
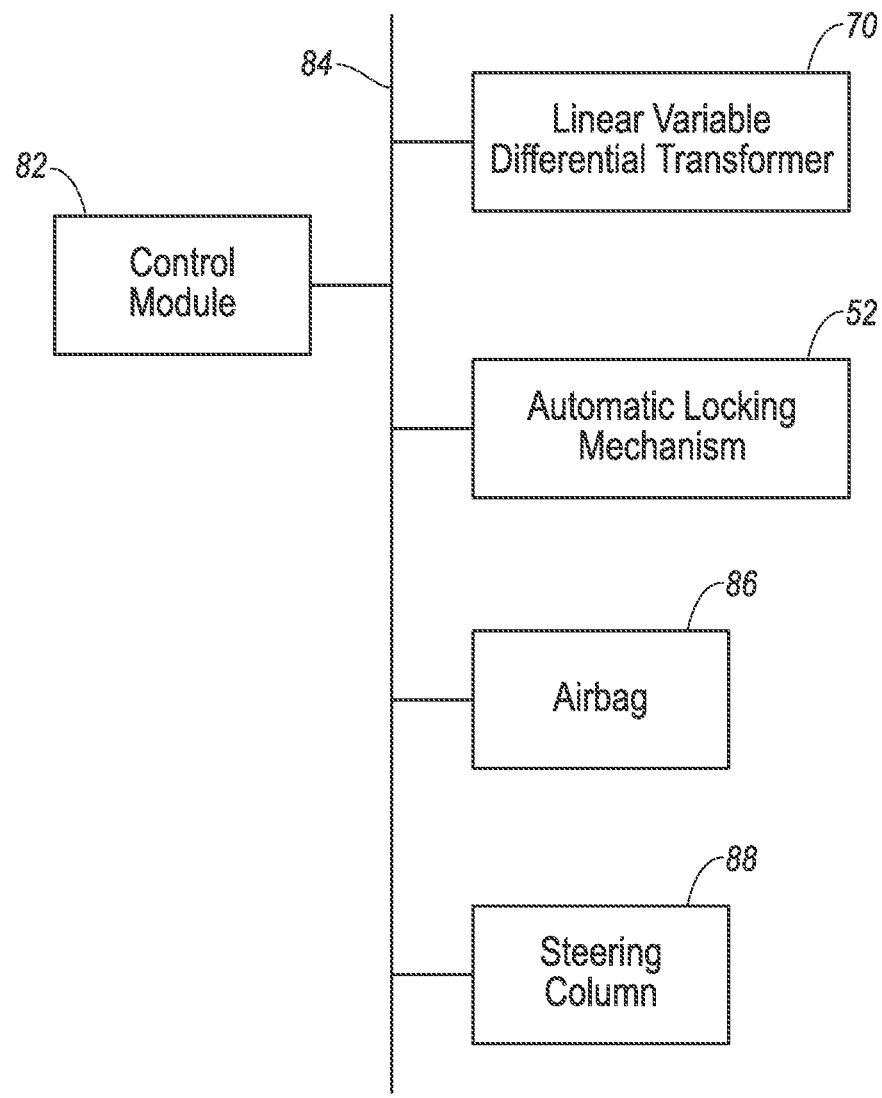
FIG. 5 is a block diagram of a control system of the restraint system.

With reference to FIG. 5, the retractor assembly 36 may include an automatic locking mechanism 52. During, e.g., sudden decelerations of the vehicle 30, the automatic locking mechanism 52 locks the spool 50 to prevent payout of the webbing 38. The automatic locking mechanism 52 has a load limit, that is, a maximum force in a direction of payout of webbing 38 beyond which the automatic locking mechanism 52 allows payout even after locking, as is known. The load limit is adjustable.

An arm 54 is rotatably coupled to the retractor housing 48 and rotatably coupled to a disc 56. The arm 54 and the retractor housing 48, for example, may be rotatably coupled through pins, engaged slots, etc. The arm 54 may be cantilevered from the retractor housing 48. The arm 54 may extend from a first end 58 coupled to the retractor housing 48 to a second end 60 coupled to the disc 56. (The adjectives "first" and "second" are used throughout this document as identifiers and are not intended to signify importance or order.) The second end 60 may be directed toward the spool 50 and toward the webbing 38. The arm 54 may be stiff, i.e., may be designed to exert pressure on the disc 56 against the webbing 38, and may lack joints between the retractor housing 48 and the disc 56.

An arm spring 62 is attached to the retractor housing 48 and to the arm 54. The arm spring 62 biases the disc 56 toward the spool 50; in other words, the arm spring 62 is in tension or compression such that the arm 54 tends to rotate about the retractor housing 48 in a direction in which the second end 60 moves toward the spool 50. The arm spring 62 may be a radial spring.

With reference to FIGS. 2 and 3, the disc 56 is threadedly coupled to the arm 54. A screw thread 64 extends from the second end 60 of the arm 54 to the disc 56. The screw thread 64 extends along a disc axis B defined by the disc 56. The screw thread 64 is fixed relative to one of the disc 56 and the arm 54 and threadedly engaged with the other of the disc 56 and the arm 54. For example, the screw thread 64 may be fixed to the disc 56 and may extend through and be threadedly engaged with the second end 60 of the arm 54. When the disc 56 rotates, the screw thread 64 screws itself through the second end 60 of the arm 54. For another example, the screw thread 64 may be fixed to the second end 60 of the arm 54 and may extend through and be threadedly engaged with the disc 56. When the disc 56 rotates, the disc 56 screws itself along the screw thread 64.

The disc 56 is in contact with the webbing 38. The disc 56 defines the disc axis B. The disc axis B is parallel to the spool axis A. The disc 56 has a circular cross-section orthogonal to the disc axis B. The disc 56 may be formed of metal. The disc 56 may have an outer edge 66 facing circumferentially away from the disc axis B and a contact face 68 facing along the disc axis B toward the second end 60 of the arm 54. The outer edge 66 may be rougher than the contact face 68, and the contact face 68 may be smoother than the outer edge 66; in other words, a coefficient of friction between an object and the contact face 68 is less than a coefficient of friction between the object and the outer edge 66. The contact face 68 may have a low-friction film such as Teflon.

With continued reference to FIGS. 2 and 3, the disc 56 is movable along the disc axis B, i.e., parallel to the spool axis A, and rotatable relative to the arm 54 about the disc axis B via the screw thread 64. The disc 56 is positioned such that extraction of the webbing 38 from the spool 50 causes the disc 56 to rotate. Specifically, the arm spring 62 biases the outer edge 66 of the disc 56 against the webbing 38, and friction between the webbing 38 and the outer edge 66 of the disc 56 applies a torque to the disc 56 when the webbing 38 extracts or retracts. The torque causes the disc 56 to rotate about the disc axis B, which via the screw thread 64 causes the disc 56 to move along the disc axis B.

Figure 4:
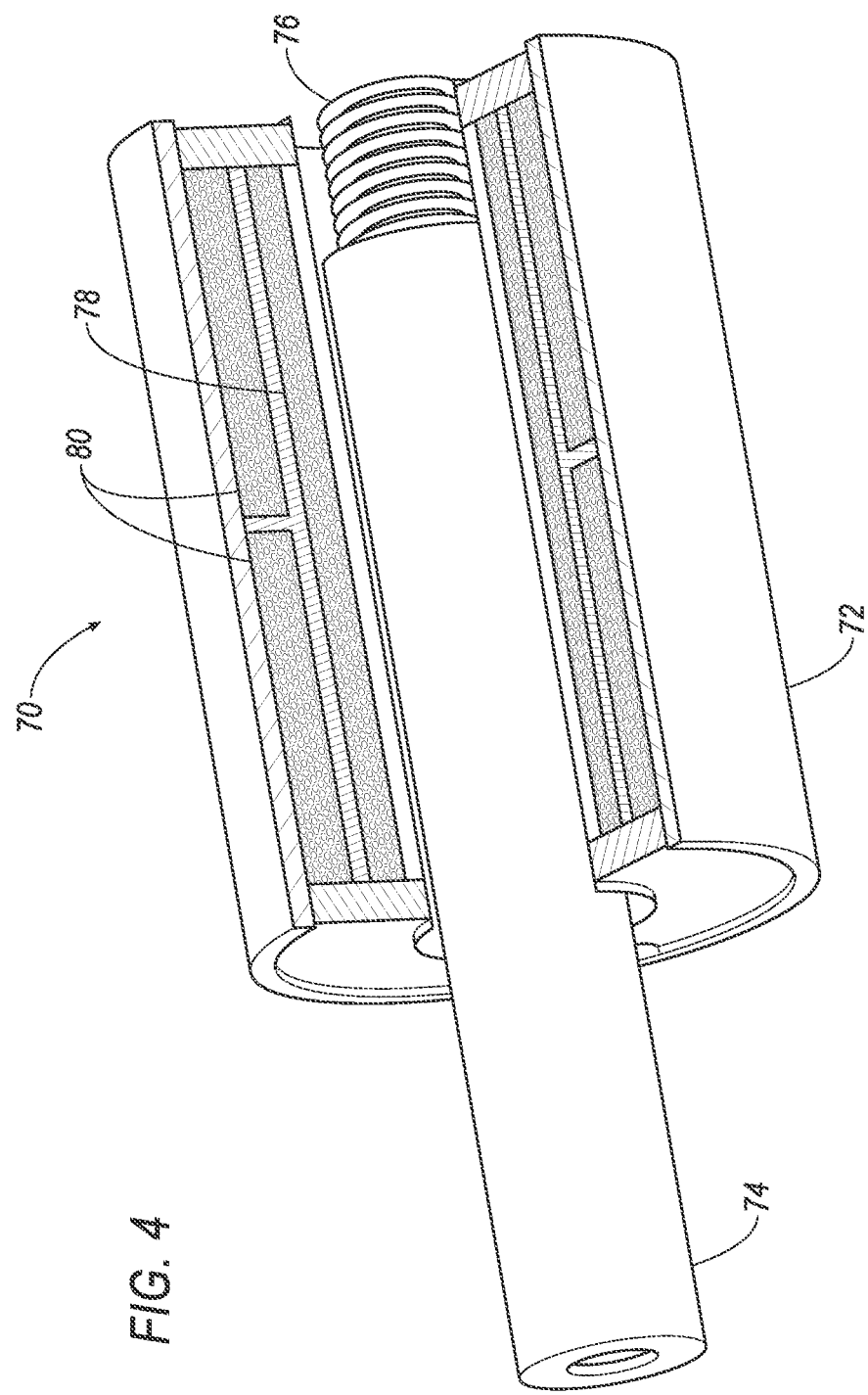
FIG. 4 is a cutaway perspective view of a linear variable differential transformer of the retractor assembly.

With reference to FIGS. 2-4, a linear variable differential transformer 70 is attached to the arm 54. The linear variable differential transformer 70 is sometimes referred to as a linear variable displacement transformer, a linear variable displacement transducer, or a differential transformer. The linear variable differential transformer 70 includes an LVDT housing 72, a core 74, and an LVDT spring 76. The LVDT housing 72 is fixed relative to the arm 54. The LVDT housing 72 may be fixed to the arm 54 at a position less than a radius of the disc 56 from the second end 60 of the arm 54. The LVDT housing 72 may have a cylindrical, tubular shape. The LVDT housing 72 may include a center coil 78 and two outer coils 80 extending circumferentially.

The core 74 may be linearly movable relative to the LVDT housing 72. Specifically, the core 74 is movable parallel to the spool axis A and the disc axis B. The core 74 may be ferromagnetic, that is, have a high susceptibility to magnetization. The movement of the core 74 through the LVDT housing 72 may induce a voltage difference between the outer coils 80 that is proportional to the position of the core 74 relative to the LVDT housing 72.

The LVDT spring 76 is coupled to the LVDT housing 72 and the core 74. The LVDT spring 76 extends from an end fixed relative to the core 74 to an end fixed relative to the LVDT housing 72. The spring may bias the core 74 toward the disc 56 relative to the LVDT housing 72. For example, the LVDT spring 76 may be in compression and exerting a force pushing the core 74 against the disc 56. The core 74 may thus contact the contact face 68 of the disc 56. The core 74 is movable parallel to the disc axis B with the disc 56. As the disc 56 moves closer to the arm 54, the disc 56 pushes the core 74 parallel to the disc axis B. As the disc 56 moves away from the arm 54, the LVDT spring 76 pushes the core 74 parallel to the disc axis B such that the core 74 maintains contact with the disc 56.

With reference to FIG. 5, the vehicle 30 may include a control module 82. The control module 82 is a microprocessor-based controller. The control module 82 may include a processor, memory, etc. The memory of the control module 82 may include memory for storing instructions executable by the processor as well as for electronically storing data and/or databases. The control module 82 may be, e.g., a restraint control module.

The control module 82 may transmit and receive signals through a communications network 84 such as a controller area network (CAN) bus, Ethernet, Local Interconnect Network (LIN), and/or by any other wired or wireless communications network. The control module 82 may be in communication with the linear variable differential transformer 70, the automatic locking mechanism 52, an airbag 86, and a steering column 88 via the communications network 84.

The airbag 86 may be disposed in a steering wheel, an instrument panel, an upper rail, etc. (not shown). The airbag 86 may be inflatable in response to a signal from the control module 82, for example, via an inflator (not shown). The airbag 86, when inflating, may have an inflation stiffness, in other words, how full of inflation medium the airbag 86 is.

The airbag 86 may be formed of any suitable airbag material, for example, a woven polymer. For example, the airbag 86 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

The steering column 88 may connect the steering wheel to the instrument panel (not shown). In an embodiment in which the seat 32 is a driver seat, the steering column 88 may be disposed in a vehicle-forward direction from the seat 32. The steering column 88 may have an adjustable stroke absorption, which is a measure of energy absorption during a collapse of the steering column 88, in other words, how easily the steering column 88 collapses when impacted.

The control module 82 may be programmed to receive a signal from the linear variable differential transformer 70 indicating a position of the core 74 relative to the LVDT housing 72. The control module 82 uses the information received from the linear variable differential transformer 70. For example, the control module 82 may be programmed to adjust a load limit of the retractor assembly 36, e.g., of the automatic locking mechanism 52, based on the position of the core 74 relative to the LVDT housing 72. For another example, the control module 82 may be programmed to adjust the inflation stiffness of the airbag 86 based on the position of the core 74 relative to the LVDT housing 72. For another example, the control module 82 may be programmed to adjust the stroke absorption of the steering column 88 based on the position of the core 74 relative to the LVDT housing 72. The control module 82 may be programmed to adjust other parameters based on the position of the core 74 relative to the LVDT housing 72.

In operation, an occupant sits in the seat 32, pulls the webbing 38 out of the retractor assembly 36, and buckles the clip 42 into the buckle 44. As the webbing 38 extracts from the spool 50, the disc 56 rotates about the disc axis B and thus translates along the disc axis B because of the screw thread 64. The core 74 of the linear variable differential transformer 70 moves with the disc 56. The linear variable differential transformer 70 continuously outputs a signal proportional to the position of the core 74 relative to the LVDT housing 72 to the control module 82. The signal is also proportional to the length of the webbing 38 extracted. Specifically, the payout distance of the webbing 38 may be given by this equation:

$$L_{web} = \frac{D}{d\tan\alpha} L_{LVDT}$$

in which $L_{web}$ is a length of the webbing 38 extracted, D is a diameter of the disc 56, d is a diameter of the screw thread 64, $\alpha$ is a pitch of the screw thread 64, and $L_{LVDT}$ is a distance measured by the linear variable differential transformer 70.

In the event of an impact, the automatic locking mechanism 52 engages, preventing extraction of the webbing 38 from the retractor assembly 36. The control module 82 transmits a signal to the automatic locking mechanism 52 specifying a load limit based on the signal from the linear variable differential transformer 70. A momentum of the occupant pushes the occupant against the webbing 38. The automatic locking mechanism 52 prevents payout of the webbing 38 until tension in the webbing 38 exceeds the load limit specified by the control module 82. If the impact triggers inflation of the airbag 86, the control module 82 transmits a signal indicating the inflation stiffness for the airbag 86. The control module 82 transmits a signal to the steering column 88 indicating the stroke absorption for the steering column 88. The load limit, the inflation stiffness, and the stroke absorption may thus be customized based on the size of the occupant.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A retractor assembly comprising:
a housing;
a spool rotatably coupled to the housing and defining an axis;
a webbing coiled about the spool;
an arm rotatably coupled to the housing;
a disc in contact with the webbing, rotatably coupled to the arm, and movable parallel to the axis; and
a linear variable differential transformer extending through the arm and including a core movable parallel to the axis with the disc;
wherein the core slidingly contacts the disc.

2. The retractor assembly of claim 1, wherein the arm is cantilevered from the housing.

3. The retractor assembly of claim 2, wherein the axis is a spool axis, and the disc is rotatable relative to the arm about a disc axis parallel to the spool axis.

4. The retractor assembly of claim 3, wherein the disc has a circular cross-section orthogonal to the disc axis.

5. The retractor assembly of claim 4, wherein the disc is positioned such that extraction of the webbing from the spool causes the disc to rotate.

6. The retractor assembly of claim 5, further comprising a spring attached to the housing and to the arm and biasing the disc toward the spool.

7. The retractor assembly of claim 6, wherein the disc is threadedly coupled to the arm.

8. The retractor assembly of claim 7, wherein the linear variable differential transformer includes a linear-variable-differential-transformer (LVDT) housing fixed relative to the arm, and the core is linearly movable relative to the LVDT housing.

9. The retractor assembly of claim 8, wherein the linear variable differential transformer includes an LVDT spring coupled to the LVDT housing and the core and biasing the core toward the disc relative to the LVDT housing.

10. The retractor assembly of claim 9, further comprising a screw thread fixed relative to one of the disc and the arm and threadedly engaged with the other of the disc and the arm.

11. The retractor assembly of claim 10, wherein the screw thread extends along the disc axis.

12. The retractor assembly of claim 9, wherein the LVDT spring is aligned with the core in a direction in which the core is linearly movable relative to the LVDT housing.

13. The retractor assembly of claim 1, further comprising a control module in communication with the linear variable differential transformer, wherein the housing is a retractor housing, the linear variable differential transformer includes a linear-variable-differential-transformer (LVDT) housing fixed relative to the arm, and the control module is programmed to receive a signal from the linear variable differential transformer indicating a position of the core relative to the LVDT housing.

14. The retractor assembly of claim 13, wherein the control module is programmed to adjust a load limit of the retractor assembly based on the position of the core relative to the LVDT housing.

15. The retractor assembly of claim 1, wherein rotational motion of the disc slides the disc along the core, and motion of the disc parallel to the axis pushes the core.

* * * * *